United States Patent
Parameswaran et al.

(10) Patent No.: US 8,813,006 B1
(45) Date of Patent: Aug. 19, 2014

(54) ACCELERATED CHARACTERIZATION OF CIRCUITS FOR WITHIN-DIE PROCESS VARIATIONS

(75) Inventors: Harindranath Parameswaran, Noida (IN); Sachin Shrivastava, Noida (IN)

(73) Assignee: Cadence Design Systems, Inc., San Jose, CA (US)

( * ) Notice: Subject to any disclaimer, the term of this patent is extended or adjusted under 35 U.S.C. 154(b) by 179 days.

(21) Appl. No.: 12/055,505

(22) Filed: Mar. 26, 2008

(51) Int. Cl.
*G06F 17/50* (2006.01)

(52) U.S. Cl.
USPC ........... 716/106; 716/100; 716/101; 716/102; 716/103; 716/104; 716/105; 716/108

(58) Field of Classification Search
USPC ....................................................... 716/1–6
See application file for complete search history.

(56) References Cited

U.S. PATENT DOCUMENTS

| | | | |
|---|---|---|---|
| 6,449,750 B1 * | 9/2002 | Tsuchiya | 716/4 |
| 6,453,446 B1 * | 9/2002 | van Ginneken | 716/3 |
| 6,704,697 B1 * | 3/2004 | Berevoescu et al. | 703/19 |
| 7,421,671 B2 * | 9/2008 | Korobkov | 716/5 |
| 7,624,364 B2 * | 11/2009 | Albrecht et al. | 716/6 |
| 7,735,033 B2 * | 6/2010 | Zhang et al. | 716/4 |
| 2006/0020441 A1 * | 1/2006 | Toyoda et al. | 703/19 |
| 2008/0133202 A1 * | 6/2008 | Tseng et al. | 703/14 |
| 2008/0276206 A1 * | 11/2008 | Mariani | 716/4 |
| 2009/0172529 A1 * | 7/2009 | Jas et al. | 715/700 |
| 2009/0228250 A1 * | 9/2009 | Phillips | 703/2 |

* cited by examiner

*Primary Examiner* — Helen Rossoshek
(74) *Attorney, Agent, or Firm* — Alford Law Group, Inc.; Tobi C. Clinton

(57) ABSTRACT

In one embodiment of the invention, a method for electronic circuit design is disclosed. The method includes analyzing a netlist of a subcircuit to determine one or more input pins and one or more output pins; forming an arc graph of the subcircuit including one or more timing arcs between the one or more input pins and the one or more output pins; and reducing the number of transistors to perturb to perform a sensitivity analysis for within die process variations over the one or more timing arcs to reduce the number of simulations to characterize the subcircuit.

18 Claims, 9 Drawing Sheets

| Cell | Input Pin | Output Pin | NI | NO | NB | N | Simulations (Full) | Simulations (Reduced) | % Reduction |
|---|---|---|---|---|---|---|---|---|---|
| OA22D1 | A1 | Z | 2 | 2 | 0 | 10 | 480 | 34 | 92.92% |
| AO31D1 | A3 | Z | 2 | 2 | 0 | 10 | 480 | 34 | 92.92% |
| NR2XD4 | A1 | ZN | 0 | 4 | 12 | 24 | 1152 | 608 | 47.22% |
| BUFFD8 | I | Z | 6 | 16 | 0 | 22 | 1056 | 144 | 86.36% |
| IOA21D4 | A1 | ZN | 2 | 12 | 0 | 20 | 960 | 94 | 90.21% |
| AOI31D0 | A3 | ZN | 1 | 4 | 1 | 8 | 384 | 82 | 78.65% |
| IND2D1 | B1 | ZN | 0 | 1 | 2 | 6 | 288 | 105 | 63.54% |
| INVD2 | I | ZN | 0 | 0 | 4 | 4 | 192 | 192 | 0.00% |
| OR4D1 | A3 | Z | 2 | 2 | 0 | 10 | 480 | 34 | 92.92% |
| ND3D4 | A3 | ZN | 4 | 12 | 4 | 24 | 1152 | 300 | 73.96% |
| MOAI22D1 | B1 | ZN | 2 | 4 | 0 | 10 | 480 | 44 | 90.83% |
| CKBD4 | I | Z | 4 | 8 | 0 | 12 | 576 | 80 | 86.11% |
| AOI21D4 | A1 | ZN | 0 | 8 | 8 | 24 | 1152 | 440 | 61.81% |
| BUFFD6 | I | Z | 4 | 12 | 0 | 16 | 768 | 104 | 86.46% |
| SEDFQD1 | CP | SE | 2 | 4 | 0 | 44 | 2112 | 78 | 96.31% |
| AN2D2 | A1 | Z | 2 | 4 | 0 | 8 | 384 | 42 | 89.06% |
| AN2D2 | A2 | Z | 2 | 4 | 0 | 8 | 384 | 42 | 89.06% |
| ND2D4 | A1 | ZN | 0 | 4 | 8 | 16 | 768 | 412 | 46.35% |
| NR4D1 | A3 | ZN | 2 | 5 | 1 | 12 | 576 | 98 | 82.99% |
| SEDFKCND1 | CP | SE | 2 | 4 | 0 | 48 | 2304 | 82 | 96.44% |
| CKAN2D0 | A1 | Z | 2 | 2 | 0 | 6 | 288 | 30 | 89.58% |
| INR2D0 | B1 | ZN | 0 | 1 | 2 | 6 | 288 | 105 | 63.54% |
| SDFD1 | CP | SE | 2 | 4 | 0 | 34 | 1632 | 68 | 95.83% |
| IIND4D2 | B1 | ZN | 2 | 8 | 2 | 20 | 960 | 168 | 82.50% |
| LHD1 | D | QN | 2 | 2 | 0 | 18 | 864 | 42 | 95.14% |
| SDFQD4 | CP | SE | 2 | 4 | 0 | 40 | 1920 | 74 | 96.15% |
| CKND3 | I | ZN | 0 | 0 | 6 | 6 | 288 | 288 | 0.00% |

FIG. 3

ACCELERATED CHARACTERIZATION OF CIRCUITS FOR WITHIN-DIE PROCESS VARIATIONS

FIELD

The embodiments of the invention relate generally to timing analysis of integrated circuit designs.

BACKGROUND

Design parameters for an integrated circuit may vary wafer lot to waver lot, from wafer to wafer within lot, from die to die on a wafer, and within die of an integrated circuit.

Referring now to background FIG. 1A, a wafer 100 is illustrated with a plurality of integrated circuit die 102A-102N formed therein in a matrix or rows and columns. FIG. 1A further illustrates a hierarchy of circuitry that may be used to define an integrated circuit die 102A. Each complete integrated circuit ("full chip") die 102A may include macro functional blocks 104 as well as lower level blocks and circuit cells. The macro functional blocks 104 for example may be processors, memory, or other types of functional blocks. The macro functional blocks 104 may be made of other smaller functional blocks 106 grouped together. The functional blocks 106, for example, may be registers, ALUs, control logic, random logic, or other types of functional blocks. The functional blocks 106 may be formed out of standard circuit cells 108 from a standard cell library.

A standard cell library typically includes a wide variety of types of standard circuit cells that provides basic low level functionality such as logic gates (e.g., AND, OR, XOR, INVERT, NAND, NOR, XNOR, BUFFER; multiplexer); basic storage logic (e.g., latch, flip flop, register, memory cell); input receivers, output drivers, and input/output buffers; tristate drivers; counters; etc. that are typically associated with an integrated circuit design. For each standard circuit cell in the standard cell library, information is provided regarding the cell dimensions, layers utilized, pin locations and layer, routing layers, and timing/delay information in a format that is known and read/writeable by IC CAD tools.

At a lowest level of an IC design and netlist are the active and passive electronic devices, such as transistors, resistors, and capacitors. Resistors and capacitors may be parasitic devices that were not intended to be a part of the design but are the result from manufacturing the semiconductor integrated circuit. One or more transistors 110 may be used to form a standard circuit cell 108.

A plurality of the one or more standard circuit cells 108 may be used to form a functional block 106. For example, a set of sixteen D-type flip flop standard cells may be placed parallel to each other with control signals interconnected to form a sixteen bit register functional block. Alternatively, a mixture of types of standard circuit cells 108 may be combined to form a functional block. For example, a two bit adder may be formed of a combination of NAND, NOR, and INVERT standard cell circuits.

Variation or uncertainty in a semiconductor integrated circuit may result from the matrix (row and column) position of an integrated circuit on the wafer. For example, the performance of integrated circuit 102B near the center of the wafer 100 may differ from the performance of integrated circuit 102A nearer the edge of the wafer 100. This may be referred to as a chip-to-chip or die-to-die variation.

Variation or uncertainty in a semiconductor integrated circuit may also be a function of location within the integrated circuit die itself. For example, circuits that are placed near an edge of the integrated circuit die may have more defects and lower yield than circuits placed near the center of a die. As another example, a circuit placed in a crowded area of an integrated circuit may experience greater heating and provide lower performance than a circuit well spaced apart with a lower level of heating and a better performance. Variation that is found within the integrated circuit itself to vary may be categorized as being an intra-chip or within-die variation. Intra-chip or within-die variation may be different at different locations of the same integrated circuit chip.

Referring now to background FIG. 1B, a pair of manufacturing lots 140A-140B of wafers with the same integrated circuit design manufactured in a plurality of matrix positions is illustrated. Lot 140A includes N wafers 100A-100N. Lot 140B includes M wafers 100A'-100M'.

In addition to the matrix position, the uncertainty in the performance of an integrated circuit may vary from wafer to wafer and from manufacturing lot to lot. For example, the performance of integrated circuit 102C on wafer 100A may differ from the performance of a similar integrated circuit 102D on wafer 100B even though they are in the same matrix position (same row, column position) on each. For example, the performance of integrated circuit 102C on wafer 100A in Lot 140A may differ from the performance of integrated circuit 102E on wafer 100A' in Lot 140B even though they are in the same matrix position (same row, column position) on each wafer. It may be the case that the performance of integrated circuit 102F on wafer 100B' will differ more from the performance of integrated circuit 102E on wafer 100A' because they are at different matrix positions and on different wafers.

The size of each fabricated geometry on a semiconductor IC depends on the local lithographic and etching environment.

A circuit cell may be placed horizontally or vertically within an integrated circuit with respect to the manufactured wafer. Because of the details of mask making technology, and optical exposures, this may cause a systematic channel length (L) dependence as a function of the cells orientation—horizontal or vertical.

The thickness of the metal and dielectric layers depends on the local chemical mechanical planarization (CMP) environment. A chemical mechanical planarization may be performed on one or more metal layers and the metal lines formed therein and/or dielectric layers reducing their thicknesses. A thinner metal signal line may generate a greater parasitic resistance and slow down signal transmission. A thinner metal power line may reduce its current carrying capabilities and result in a power failure. A thinner dielectric layer may result in increased parasitic capacitance between metal layers and the metal lines formed therein and reduce the speed of signal transmission.

Device and interconnect sizes may also depend on where in the optical field the device lies on the integrated circuit (an intra-chip or within-die variation).

Deposition and etching steps typically vary across a wafer's surface. Even with real time control, the thickness of a feature may only be exactly correct at one spot of a wafer.

Referring now to background FIG. 1C, the integrated circuit design 152 is manufactured into silicon chips or die 102 across lots of wafers 100 in a manufacturing facility 150A-150B that may be referred to as a wafer fab or fab. The fab 150A-150A in which the chip will be built may be unknown, and perhaps not yet constructed. Even if pre-existing, the wafer fab manufacturing performance and statistics may be time varying, such as from lot to lot or from wafer to wafer.

Additionally, the IC design 152 may be manufactured in differing fabs 150A-150B so that the performance or the IC varies from fab to fab.

With the same IC design netlist 152 for the integrated circuit, differing standard cell libraries 154A-154B may be used and provide performance variations. Even if the same standard cell library is used with the same IC design netlist 152, manufacturing differences in the fabs 150A-150B can cause variations in the performance of the integrated circuits 102G-102H manufactured in each of the respective wafers 100X-100Y.

With shrinking sizes, the inherent effect of process variations is playing a larger factor in defining the behavior of a circuit. Modeling the effects of process variations in the design stage of a circuit may improve its yield during manufacturing and its performance during operation.

BRIEF SUMMARY

The embodiments of the invention are summarized by the claims that follow below.

BRIEF DESCRIPTIONS OF THE DRAWINGS

FIG. 3 is a table to compare the number of simulations for full WID simulation and reduced WID simulation for timing or delay arcs of exemplary cell subcircuits.

DETAILED DESCRIPTION

Figure 1A:
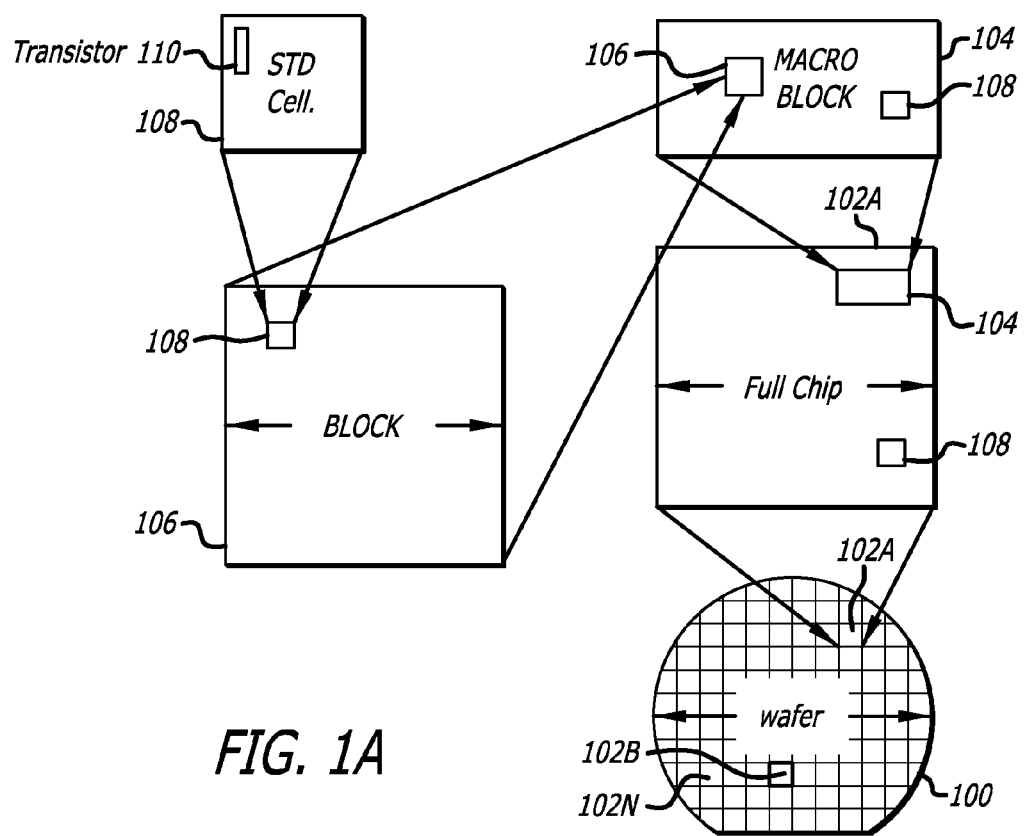
FIG. 1A is a background figure illustrating an exemplary hierarchy of an integrated circuit that is stepped across a matrix of a wafer during its manufacture.
Figure 1B:
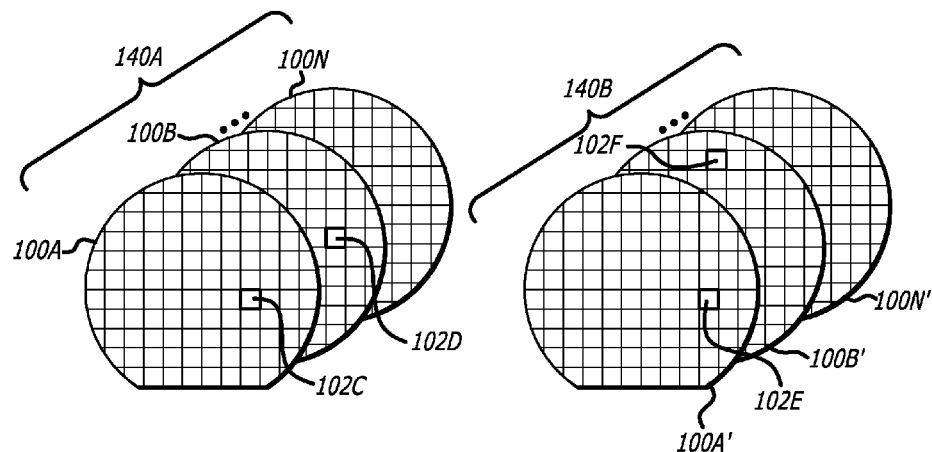
FIG. 1B is a background figure illustrating a plurality of wafers in a pair of lots each including an integrated circuit design.
Figure 1C:
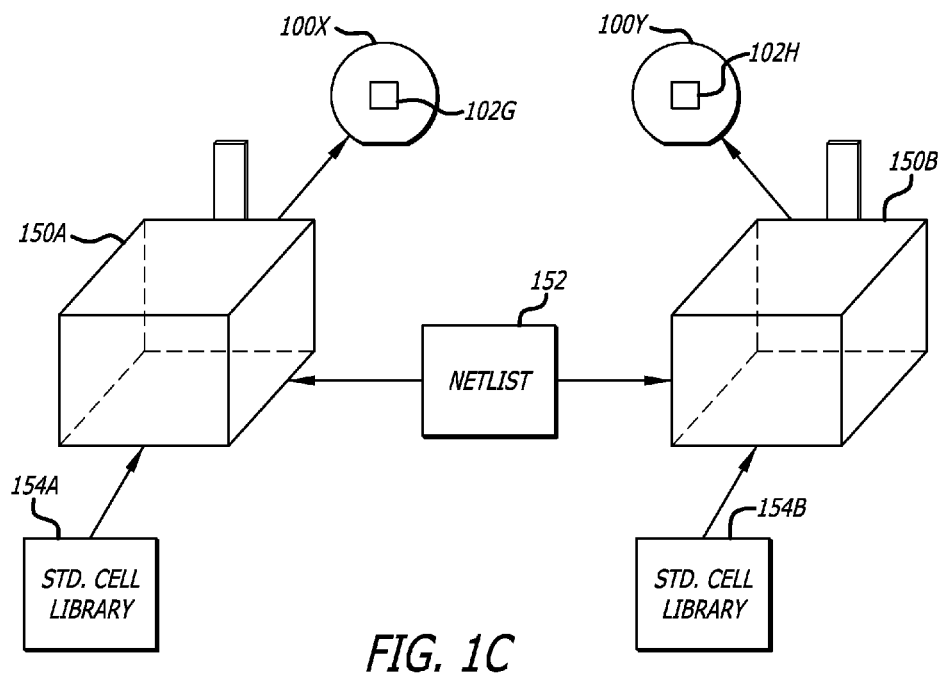
FIG. 1C is a background figure illustrating a pair of different wafer manufacturing facilities that may be used to manufacture an integrated circuit design.

In the following detailed description of the embodiments of the invention, numerous specific details are set forth in order to provide a thorough understanding of the embodiments of the invention. However, the embodiments of the invention may be practiced without these specific details. In other instances well known methods, procedures, components, and circuits have not been described in detail so as not to unnecessarily obscure aspects of the embodiments of the invention.

Introduction

Conventional static timing analysis (STA) using best case/worst case analysis is usually overly pessimistic but may also be too optimistic in some cases. This has resulted in the promotion of statistical static timing analysis (SSTA) over conventional static timing analysis as a method for estimating yield of a circuit in terms of timing activities.

The accuracy of statistical static timing analysis is directly related to the accuracy and availability of statistical information in the technology file or timing library of a cell library. Timing libraries, as generated by some characterization tool, usually include data about the timing characteristics of standard cells (or blocks) or cell subcircuits but may not include statistical information for statistical static timing analysis.

For statistical static timing analysis, information regarding the effect that process variations have on the library timing data is to be included in the technology file or timing library. Characterization tools may be used to generate the process variation information for the technology file or timing library of the cell library.

One method that characterization tools may use to generate process variation information of the library timing data for each cell subcircuit is to perturb the various process parameters independently, measure the effect of these perturbations on the timing data, and then use the non-perturbed and the perturbed library timing data to generate sensitivities of the library timing data to variations. However, this process leads to a significant runtime increase in the characterization of the cell subcircuits of a cell library.

For die-to-die (D2D) variation characterization, the runtime increase is bound by the number of process parameters being considered. For example, five to six parameters may typically be considered for D2D variations but any number of process parameters may be considered for a given wafer fab. The runtime increase is proportional to the number of D2D parameters considered. However, when characterizing the effect of within-die (WID) variations, the runtime requirement is substantially greater.

Characterization for WID variations or effects involves perturbation of each individual transistor in a given subcircuit, and computing the effect of that variation to generate the sensitivity of the cell to WID variations. For example, assume that a subcircuit has twenty transistors, there are five process parameters that cause variation, and the number of simulations for generation of nominal timing data is X. To fully simulate a given subcircuit for WID variation sensitivity, the number of simulations typically run would be equal to product of the number of transistors, the number of WID variables considered, and the number of simulations to generate nominal timing data. In this example, the number of simulations run for full simulation would be the product of 20, 5 and X ((20*5)*X=100X), or one hundred times the number of simulations to generate nominal timing data. This can be a substantial increase in runtime, and an impediment to the generation of libraries with process variation information for statistical static timing analysis. Capturing the effects of WID variations on timing can lead to an explosion in the runtime to characterize a plurality of circuits.

Methods to reduce runtime in characterizing circuits for WID variation sensitivities are disclosed herein. Generally, the methods disclosed herein take into account the effect that variations have on specific transistors in the cell subcircuit (subckt) to reduce the number of variations that require simulation for input slew and output load. That is, the effects of WID variations within a cell subcircuit are analyzed and isolated to a subset of transistors (e.g., input transistors, output transistors, and input/output transistors) in the subcircuit to reduce the number of simulations to simulate the subcircuit for WID variations for input slew and output load. By reducing the required number of simulations to account for WID variations, the runtime to simulate WID variations can be reduced significantly.

Transistor Pruning

While substantially all transistors in a cell subcircuit are used to generate the timing model of the cell, the effect of transistor variations can be isolated to a lesser number of transistors. The timing arc that is being characterized for WID variations is analyzed to prune down the number of transistors which are perturbed. That is, fewer than all transistors in a subcircuit need to be perturbed to acquire information on how WID variations effect the propagation of a signal across a timing arc.

Disclosed herein are techniques that may be used to prune down the number of transistors that are perturbed in a timing arc. Given a timing arc from a specific input pin to a specific output pin, when slew of the input signal at the input pin is varied, the effect of variations in the output signal on the output pin can be isolated in terms of the effect of process variations on the transistors that are directly connected to the input pin. Similarly, when the output at the load is varied, the effect of process variations on the output signal can be isolated in terms of the effect of process variations on the transistors that are directly connected to the output pin. Transistors that may be connected between the input pin and the output pin (e.g., transfer gates, inverters) are also considered. While each transistor is simulated at nominal and perturbed once to generally determine its timing affect due to variations, transistors directly connected to the input pin and transistors directly connected to the output pin are further perturbed to characterize the effect of within-die process variations on the signal timing for input slew variations at the input pin and output load variations at output pin, rather than considering all of the transistors of the subcircuit for input slew variations and output load variations.

Transistors in the subcircuit that are not directly connected to either the input pin or the output pin of the timing arc are not perturbed for process variations to reduce simulation time. However, some cell subcircuits are so simple (e.g., inverter, buffer) that all transistors in the subcircuit are either directly coupled to the input pin, the output pin, or both the input pin and the output pin, in which case, there is no transistor pruning or runtime reduction available for such cells.

Figure 2A:
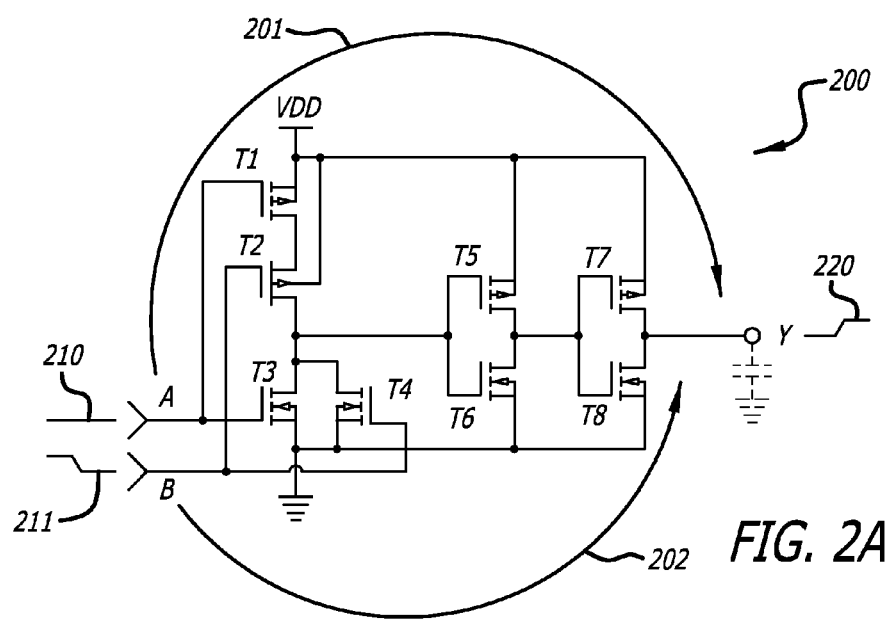
FIG. 2A is a schematic diagram of an exemplary cell subcircuit that may be characterized by embodiments of the invention.

Referring now to FIG. 2A, consider the schematic diagram of the two-input complementary metal oxide semiconductor (CMOS) buffered NOR gate 200, for example. The NOR gate 200 has a pair of inputs A and B and an output Y. The buffered NOR gate 200 includes P-channel field effect transistors (PFETs) T1, T5, and T7 and N-channel field effect transistors (NFETs) T3, T4, T6, and T8 coupled together as shown between power (VDD) and ground (VSS).

Figure 2B:
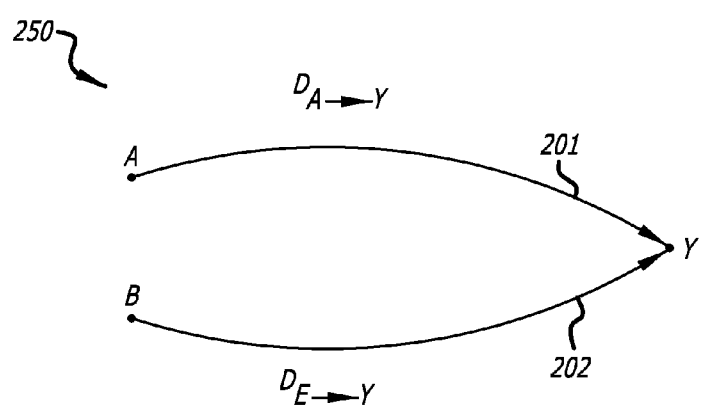
FIG. 2B is an arc graph of the exemplary cell subcircuit of FIG. 2A.

Reference is respectively now made to the exemplary schematic diagram of the exemplary cell subcircuit 200 and the exemplary arc graph 250 of the exemplary cell subcircuit of FIGS. 2A and 2B. A first timing or delay arc 201 may be defined from input A to output Y. A second timing or delay arc 202 may be defined from input B to output Y. Consider for example the first timing arc 201 from input A to output Y. Typically when calculating the sensitivity of the delay $D_{A \to Y}$ in the first timing arc 201, each transistor is varied one by one to capture sensitivities of the delay to each transistor. However, to reduce the simulation time to determine WID effects to process variations, the embodiments of the invention may perturb those transistors directly connected to the input A and the output Y of the first timing or delay arc 201 for input slew variations and output load variations, without having to simulate variations in each and every transistor for input slew variations and output load variations.

Initially, a nominal spice simulation is run to simulate transistors T1-T8 of the NOR gate 200 illustrated in FIG. 2A to determine a base line to compare against. Eight additional simulations are run, one simulation for each transistor, with each transistor being independently varied to determine its affects on circuit timing away from nominal. Next, the input transistors, the output transistors, and the input/output transistors may be independently varied (perturbed) to determine affects of input slew variations and output load variations on circuit timing.

For the first timing arc 201 of the NOR gate 200, transistors T1 and T3 are directly coupled to input A and transistors T7 and T8 are directly coupled to output Y. In the netlist of the NOR gate 200, no transistor is coupled between both the input A and the output Y in the first timing arc. Thus, the embodiments of the invention may perturb transistors T1, T3, T7, and T8 without perturbing transistors T2, T4, T5, and T6 in order to more efficiently determine WID effects on the first timing arc 201 to process variations. Similarly, the embodiments of the invention may perturb transistors T2, T4, T7, and T8 without perturbing transistors T1, T3, T5, and T6 in order to more efficiently determine WID effects on the second timing arc 202 to process variations.

Referring momentarily to FIG. 3, a table of cell subcircuits (a subset of cells in a cell library) and corresponding timing or delay arcs from input pin to output pin are tabulated. For each given timing or delay arc of a row, the table indicates the values for the number of transistors $N_I$ connected to input pin of the delay arc and not connected to output pin of delay arc; the number of transistors $N_O$ connected to output pin of delay arc and not connected to input pin of delay arc; the number of transistors $N_B$ connected to both of the input pin as well as the output pin of delay arc; and the total number of transistors N in the given cell subcircuit.

The table of FIG. 3 further indicates the total number of simulations to fully simulate the delay arc for each transistor and the reduced number of simulations to simulated the delay arc with the reduced transistor perturbations. The last entry in each row indicates the percentage reduction in simulation runs when the reduced number of simulations is used to simulate the delay arc with the reduced transistor perturbations.

For example, the timing or delay arc from input A1 to output Z of the cell named OA22D1 in the first row may have a 92 percent reduction in simulation runs when the reduced number of simulations is used to simulate the delay arc with the reduced transistor perturbations. However, the timing or delay arc from input I to output ZN of the cell named CKND3 in the last row may have a 0 percent reduction in simulation runs when the reduced number of simulations is used to simulate the delay arc with the reduced transistor perturbations. This is because all six transistors in the cell CKND3 are coupled between the input pin and the output pin and are needed to properly simulate the effects of WID over process variations. The cell INVD2 is similar to the cell CKND3 having all four of its transistors coupled between the input pin and the output pin.

For a library of cells with approximately 1075 timing arcs, the cell library may be characterized for WID variations with a reduction of approximately 87 percent in simulation runs when the reduced number of simulations is used to simulate the delay arc with the reduced transistor perturbations.

WID Characterization for Timing Model

Various timing models may be used to simplify the timing characteristics of a circuit for various circuit design tools, such as a static timing analysis tool. Timing models are simple abstractions of a circuit when compared to a spice representation.

As one aspect of some embodiments of the invention, timing models are specified in the terms of look-up tables that are indexed in terms of input signal slew at input pins and output loading at output pins of a cell. The output signal waveform is represented in terms of the slew of the input signal and the load at the output of a pin in a given timing-arc. While variations for individual transistors may be generated, the timing model may store a single composite value for the cell subcircuit. The actual content of the data being stored may be a simple representation in terms of slew/delay numbers or a more complex current waveform representation—however, typically the simulation setup (e.g., spice deck) for either representation are the same. To generate a timing model, a circuit is characterized through simulations to obtain values representing the timing model.

For example, consider the NOR gate 200 illustrated in FIG. 2A having a typical spice netlist of transistors and parasitic resistances and capacitances coupled together and to power and ground. A simulation setup or spice deck to model the rise transition from low-high at the output pin Y along the delay arc 202, is to couple a capacitive load $C_L$ to the output pin Y, and couple input signals 210-211 respectively to the input pins A and B. The input signal 210 holds input pin A at a low logic level while the input signal 211 transitions the input pin B from a high to low logic level.

The values for the model are generated by examining the output waveform 220 and extracting out the information on the propagation of the signal across the cell. The fall transition from high to low logic levels at the output pin Y along the delay arc 202 may be similarly simulated but with the input signal 211 coupled to the input pin B transitioning from a low logic level to a high logic level. The delay arc 201 from input A to output Y may be similarly analyzed for rise transition and fall transition in the output signal waveform. This type of setup and modeling may be referred to as nominal characterization of a cell subcircuit.

To fully characterize WID effects from process variations, the spice deck or modeling setup for the nominal characterization is replicated multiple times with one transistor being varied between each modeling setup. If a circuit is to be fully simulated, there is one modeling setup or spice deck to run for each transistor per process parameter being studied for WID effects. Consider for example the NOR gate 200 illustrated in FIG. 2A having a total of 8 transistors. To fully simulate the NOR gate 200 for WID effects with one process parameter being varied, there would be eight modeling setups or spice decks. Each of the eight spice decks may be spice simulated to fully characterize the WID effects for the NOR gate 200. Eight separate spice runs may be executed separately or more than one spice deck can be combined into one and simulated together more efficiently to obtain runtime gains. Note that if two process parameters were varied, there would be sixteen modeling setups or spice decks to fully simulate the NOR gate 200 for WID effects.

Sensitivity Analysis for within Die Process Variation Effects

The WID effects of process variations can be determined by a sensitivity analysis of the timing or delay arcs from input pins to output pins. The sensitivity of the timing or delay arc $D_{A \to Y}$ due to the variation of a transistor $T_n$ can be determined by taking a derivative of the delay arc $D_{A \to Y}$ function with respect to the transistor $T_n$ illustrated by equation (1) as follows:

$$S_n = \frac{\partial D_{A \to Y}}{\partial T_n} \quad (1)$$

Assuming an exhaustive approach without any transistor reduction such that the sensitivity of each transistor in the cell is available, sensitivity of delay to normalized WID variation $N_{WID}(0,1)$, can be determined by taking the square root of the sum of squared products of the delay arc sensitivity $S_n$ due to each transistor variation and the standard deviation $\sigma_n$ as illustrated by equation (2) as follows:

$$S_{WID} = \sqrt{\sum_{n=1}^{N} (S_n \sigma_n)^2} \quad (2)$$

where N is the number of transistors in the cell. The standard deviation $\sigma_n$ is the standard deviation of the process parameter change in the $n^{th}$ transistor. The wafer fab foundry or wafer manufacturer provides the statistical information for the standard deviation $\sigma_n$ by performing studies of various manufactured test structures and manufactured integrated circuits in the given wafer fab foundry or wafer manufacturing facility.

Note that the input signal slew to an input pin of a cell subcircuit and the output load placed upon an output pin of the cell subcircuit can vary from instantiation to instantiation of the same cell subcircuit within an integrated circuit. Note also that the sensitivities of delay to normalized WID variation are output load and input signal slew dependent. Thus, it is desirable to characterize a circuit for the sensitivity to within die variations for a range of output loads and input signal slew rates. Slew indices and load indices may be defined for the respective range of expected input signal slew rates and expected output loads.

If slew indices are $S_i$ (i=1, 2, ..., $N_S$), and load indices are $L_j$ (j=1, 2, ..., $N_L$), the sensitivity of delay $D_{A \to Y}$ in the timing arc to variation in transistor $T_n$, a series of sensitivities for a cell subcircuit may be determined with equation (1) being expanded into equation (3) as follows:

$$S_n^{(S_i, L_j)} = \frac{\partial D_{A \to Y}^{(S_i, L_j)}}{\partial T_n} \quad (3)$$

With the slew indices $S_i$ (i=1, 2, ..., $N_S$) and the load indices $L_j$ (j=1, 2, ..., $N_L$), the WID sensitivity of delay for a given output load and input signal slew can be determined by expanding equation (2) into equation (4) as follows:

$$S_{WID}^{(S_i, L_j)} = \sqrt{\sum_{n=1}^{N} \left(S_n^{(S_i, L_j)} \sigma_n\right)^2} \quad (4)$$

where i=1, 2, ..., $N_S$, and j=1, 2, ..., $N_L$.

To fully simulate one arc in a circuit for WID sensitivity, the total number of spice simulations would be the product of the number of transistors N, the number of different input slew rates $N_S$, and the number of different output loads $N_L$ or ($N*N_S*N_L$). Thus, a large number of spice simulations may be executed in order to fully simulate each timing arc in a circuit for WID sensitivity. Thus, a full simulation of each cell subcircuit in a cell library for WID variations (including variations effecting each transistor, input slew rate, and output load) can significantly increase the time to characterize an entire cell library of logic cell subcircuits.

While it is true that WID variation effects may be formulated in terms of all the transistors in a given subcircuit, timing models may be used to simplify the requirements of computing the effects of WID variations in timing.

Timing Model with Reduced WID Sensitivity Analysis

A timing model may be used to more simply represent the timing delay and WID process variation effects of a circuit. However, full characterization of each cell subcircuit in a cell library may take significant time. Transistor pruning was previously discussed herein. Transistor pruning is now further described with respect to timing models and within die sensitivity analysis.

Figure 4:
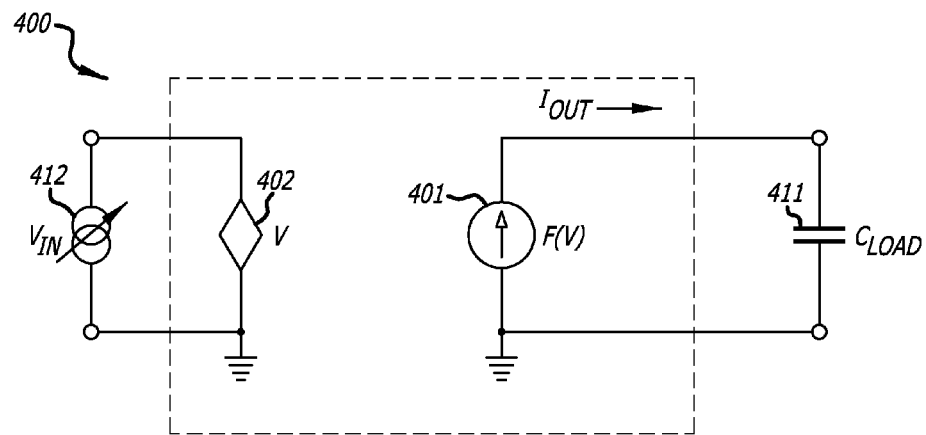
FIG. 4 is a schematic diagram of an exemplary model for WID simulation and cell characterization.

Referring now to FIG. 4, a current source model 400 may be used as a timing model for characterization of cell subcircuits for WID variations as well as for static timing analysis and statistical static timing analysis considering WID variations. Computer aided design software vendors may provide more sophisticated models such as Cadence Design System's effective current source model (ECSM) or Synopsis's composite current source (CCS) model.

The timing or current source model 400 may include a current source 401 that generates an output current or waveform that is a function of the input voltage V determined to be applied across its input terminals, such as by a voltage measuring device 402, and the output load that is applied to its output terminals. For the purpose of characterization, a variable input voltage $V_{IN}$ 412 is coupled to the input terminals of the circuit being modeled while an output load $C_{LOAD}$ 411 is coupled to the output terminals of the circuit being modeled. The model 400 is generated to accurately represent in a simplified manner the characteristics of a given circuit with a variable input voltage $V_{IN}$ 412 and a given output load $C_{LOAD}$ 411. Typically during an event, a transition in the input voltage causes a transition in the output voltage.

Figure 5:
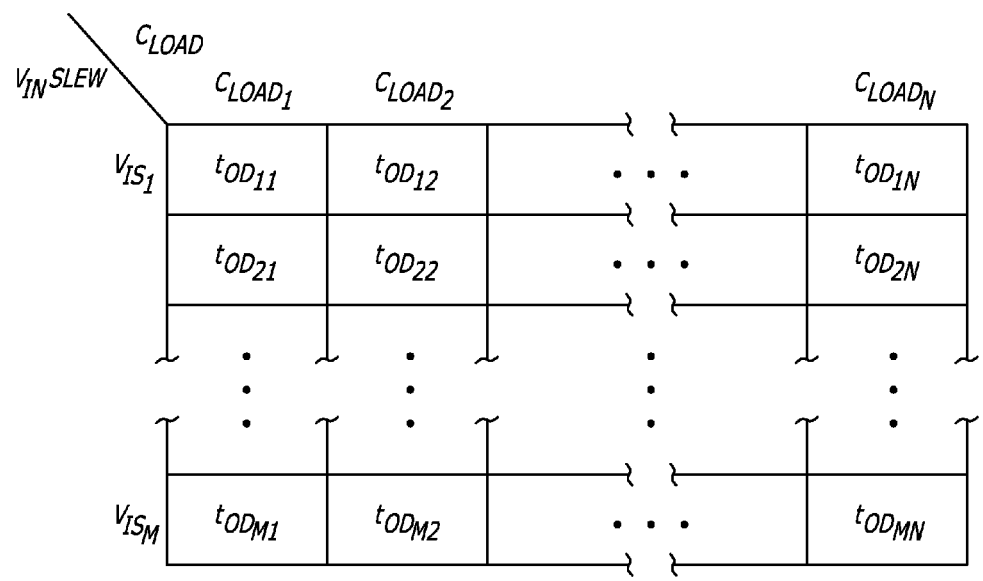
FIG. 5 is an exemplary table of timing values indexed by input signal slew and output load.
Figure 6:
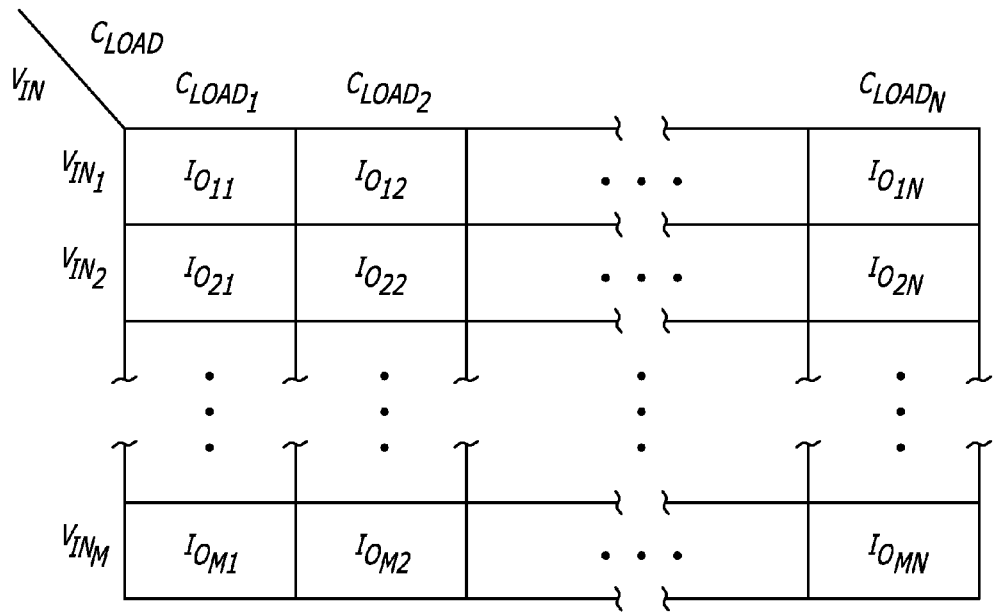
FIG. 6 is an exemplary table of output current values indexed by input signal slew and output load.

Referring now to FIGS. 5-6, the timing model may respectively use a tabular representation of a set of timing values (e.g., propagation time ($T_{ODmn}$) and output signal slew) or a set of current waveforms at the output $I_{Omn}$ that is responsive to the input voltage $V_{in}$ and the output load $C_{LOAD}$. The table may be indexed in terms of some characteristic of the signal at the input (e.g., input signal slew $V_{ism}$), and a load $C_{LOAD}$ applied to the output of the cell. Thus, the electrical parameters of interest with the model and circuits are the voltage sources applied at the input pin and the capacitive load at the output pin.

Assuming a nominal case without varying any transistor for WID effects, the circuit is characterized and modeled as to how output load changes effect timing of the cell subcircuit such as the propagation time and output signal slew.

To characterize and model for WID variations, it is desirable to characterize how transistor changes in the cell subcircuit, for example, will effect the measurements of the timing characteristics of the cell subcircuit for output load changes.

Note that changes in the output load at the output of the circuit primarily affect the transistors of the cell subcircuit that are directly connected to the output pin. Thus with little loss in accuracy, sensitivity of timing measurements in terms of WID variations can be captured in terms of variations of the output transistors of the cell subcircuit that are directly connected to the output pin while ignoring other transistors in the cell subcircuit.

Note that variations of the input signal slew primarily affect the transistors of the cell subcircuit that are directly connected to the input pin. Thus with little loss in accuracy, sensitivity of timing activities in terms of WID variations can be captured in terms of variations of input transistors of the cell subcircuit that are directly connected to the input pin while ignoring other transistors in the cell subcircuit.

Thus, timing models may be used with transistor pruning to reduce the number of transistors that need to be perturbed for capturing the effects of WID variations on timing to reduce the runtime in simulating for WID variations.

Referring back to FIGS. 2A and 2B and the timing or delay arc A→Y from input pin A to output pin Y, input slew variations may be considered with input transistors T1 and T3 to capture the effects of WID variations on timing while ignoring the other transistors of the cell subcircuit 200. For the timing or delay arc A→Y from input pin A to output pin Y, output load variations may be considered with output transistors T7 and T8 to capture the effects of WID variations on timing while ignoring the other transistors of the cell subcircuit 200. Cell subcircuit 200 is a relatively simple circuit and can achieve a runtime reduction with transistor pruning. More complicated cell subcircuits with greater transistor numbers and stages may achieve even greater runtime reductions with transistor pruning.

Generally for a given timing or delay arc of a cell subcircuit, the number of simulations and the runtime reduction can be determined to capture the effects of WID variations on timing. For the given timing or delay arc of a cell the following variables can be defined:

T is the set of all transistors (N) in the cell, $T=T_n$ (n=1, 2, ..., N);
TI is the set of transistors ($N_I$) connected to input pin of delay arc (input transistors), $TI=TI_n$ (n=1, 2, ..., $N_I$);
TO is the set of transistors ($N_O$) connected to output pin of delay arc (output transistors), $TO=TO_n$ (n=1, 2, ..., $N_O$);
TB is the set of transistors ($N_B$) connected to both input and output pin of delay arc (input/output transistors), $TB=TB_n$ (n=1, 2, ..., $N_B$);
$S_i$ is the set of input slew indices (i=1, 2, ..., $N_S$); and
$L_j$ is the set of output load indices (j=1, 2, ..., $N_L$).

A full simulation of a cell subcircuit for WID sensitivity is calculated using equations (3,4). The number of spice simulations for full simulation (FS) of a timing or delay arc in a cell subcircuit for WID sensitivity is the product of the total number of transistors N, the total number of input slew indices $N_S$, and the total number of output load indices $N_L$, or FS=($N*N_S*N_L$). As discussed previously, the number of simulations to run to determine WID sensitivity with a reasonable accuracy can be reduced by pruning the number of transistors that are perturbed.

To calculate a reasonably accurate WID sensitivity (SN) with a reduced number of simulations, an intermediate or nominal slew index $S_{nom}$ and an intermediate or nominal load index $L_{nom}$ are selected respectively from the sets of input slew and output load indices. For example, if there are ten slew indices ranging from $S_1$ to $S_{10}$, the intermediate or nominal slew index $S_{nom}$ may be the fifth slew index $S_5$. After selection of the intermediate or nominal slew index $S_{nom}$ and the intermediate or nominal load index $L_{nom}$, the WID sensitivity with reduced simulations may then be calculated using equations (5) and (6) as follows:

$$SN_n^{(S_i,L_j)} = \begin{cases} \dfrac{\partial D_{A \to Y}^{(S_i,L_j)}}{\partial T_n}; & T_n \in TI \quad T_n \in TO \\ \dfrac{\partial D_{A \to Y}^{(S_i,L_{nom})}}{\partial T_n}; & T_n \in TI \quad T_n \notin TO \\ \dfrac{\partial D_{A \to Y}^{(S_{nom},L_j)}}{\partial T_n}; & T_n \notin TI \quad T_n \in TO \\ \dfrac{\partial D_{A \to Y}^{(S_{nom},L_{nom})}}{\partial T_n}; & T_n \notin TI \quad T_n \notin TO \end{cases} \quad (5)$$

In the first case, if a transistor $T_n$ is coupled to both the input pin A and the output pin Y, $T_n \in TI$ and $T_n \in TO$, then the sensitivity of the cell subcircuit to variations in that transistor is computed by taking the partial derivative of the timing or delay arc over all input slew and output load indices with respect to that transistor $T_n$ or $$\dfrac{\partial D_{A \to Y}^{(S_i,L_j)}}{\partial T_n}.$$

In the second case, if a transistor $T_n$ is coupled to the input pin A but not the output pin Y, $T_n \in TI$ and $T_n \notin TO$, then the sensitivity of the cell subcircuit to variations in that transistor is computed by taking the partial derivative of the timing or delay arc over all input slew indices and with the nominal output load index with respect to that transistor $T_n$ or $$\dfrac{\partial D_{A \to Y}^{(S_i,L_{nom})}}{\partial T_n}.$$

In the third case, if a transistor $T_n$ is coupled to the output pin Y but not the input pin A, $T_n \notin TI$ and $T_n \in TO$, then the sensitivity of the cell subcircuit to variations in that transistor is computed by taking the partial derivative of the timing or delay arc over all output load indices and with the nominal input slew index with respect to that transistor $T_n$ or $$\dfrac{\partial D_{A \to Y}^{(S_{nom},L_j)}}{\partial T_n}.$$

In the fourth case, if a transistor $T_n$ is neither coupled to the input pin A nor the output pin Y, $T_n \notin TI$ and $T_n \notin TO$, then the sensitivity of the cell subcircuit to variations in that transistor is computed by taking the partial derivative of the timing or delay arc with the nominal input slew and output load indices with respect to that transistor $T_n$ or $$\dfrac{\partial D_{A \to Y}^{(S_{nom},L_{nom})}}{\partial T_n}.$$

Given the sensitivities to WID variations for each transistor in the cell subcircuit determined as described above, the WID sensitivity of the cell subcircuit to each of given indices (input slew indices and output load indices) may be computed by equation (7) as follows:

$$SN_{WIF}^{(S_i,L_j)} = \sqrt{\sum_{n=1}^{N} \left(SN_n^{(S_i,L_j)} \sigma_n\right)^2} \quad (6)$$

Figure 7:
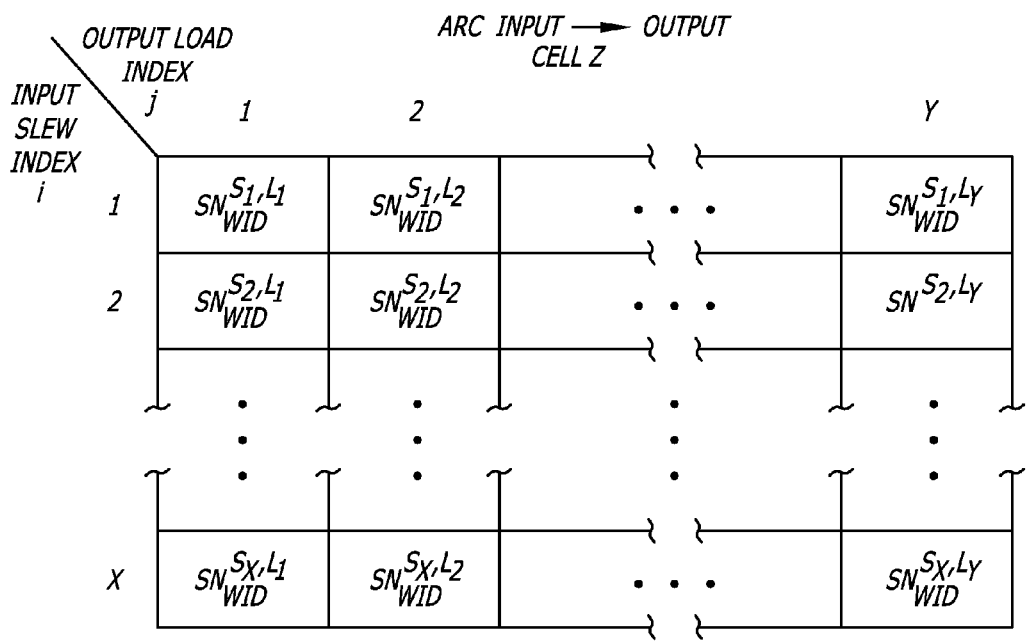
FIG. 7 is an exemplary table of WID sensitivity values for a timing or delay arc of a cell subcircuit indexed by input slew and output load.

The WID sensitivities of the timing or delay arc for a given output load and input signal slew can be determined with equation (6) by taking the square root of the sum of squared products of the delay arc sensitivity $S_n$ for each transistor variation with the given output load index $L_j$ and the given input signal slew index $S_i$ and the standard deviation $\sigma_n$ of the process parameter change in the $n^{th}$ transistor. The computations for $SN_{WID}^{(S_i,L_j)}$ for each of the given indices (input slew indices and output load indices) may be tabulated into a look up table form as illustrated in FIG. 7.

The look up table of WID sensitivity values may be annotated to the given cell subcircuit description of the technology file for a cell library for use with a statistical static timing analysis tool. If there are multiple timing or delay arcs for a given cell subcircuit, a respective plurality of look up tables for the WID sensitivities for each timing or delay arc may be generated. The plurality of tables for the plurality of arcs may be annotated to the given cell subcircuit description of the technology file in the cell library for use with a statistical static timing analysis tool.

With equations (5) and (6), the reduced number of simulations (RS) to determine WID sensitivities of the timing or delay arc may be computed with equation (7) as follows:

$$RS = (N_B)*N_S*N_L + (N_I - N_B)*N_S + (N_O - N_B)*N_L + (N - N_I - N_O + N_B) \quad (7)$$

Assuming that the cell subcircuit had some complexity so that there was a reduction in transistor perturbation, the number of input transistors and output transistors is less than the total number of transistors in the cell subcircuit ($N_I, N_O < N$). Further assuming that the cell subcircuit is not a transfer gate, then the number of input/output transistors is less than the number of input transistors and the number of output transistors ($N_B < N_I, N_O$). With these inequalities, it can be seen that the reduced number of simulations (RS) computed by equation 7 is less than the full number of simulations (FS) computed using the equation $FS = N*N_S*N_L$ described previously. FIG. 3 illustrates full simulation number, the reduced simulation number, and the percentage reduction in simulations of WID variations for timing or delay arcs of exemplary cell subcircuits that are included in a cell library.

For an exemplary cell library having 300 cell subcircuits and a total of 1075 delay arcs, the number of simulations (characterization run-time) may be reduced by approximately 87.55%. The error between the results for WID variations using the full number of simulations and the reduced number of simulations is reasonable and may be within a few percent when comparing various input slew and output load indices for a given subcircuit. As the runtime reduction may be substantial and the accuracy reasonable for the WID sensitivities with the reduced number of simulations, the reduction methods described herein are acceptable.

Methods of Operation

Figure 8:
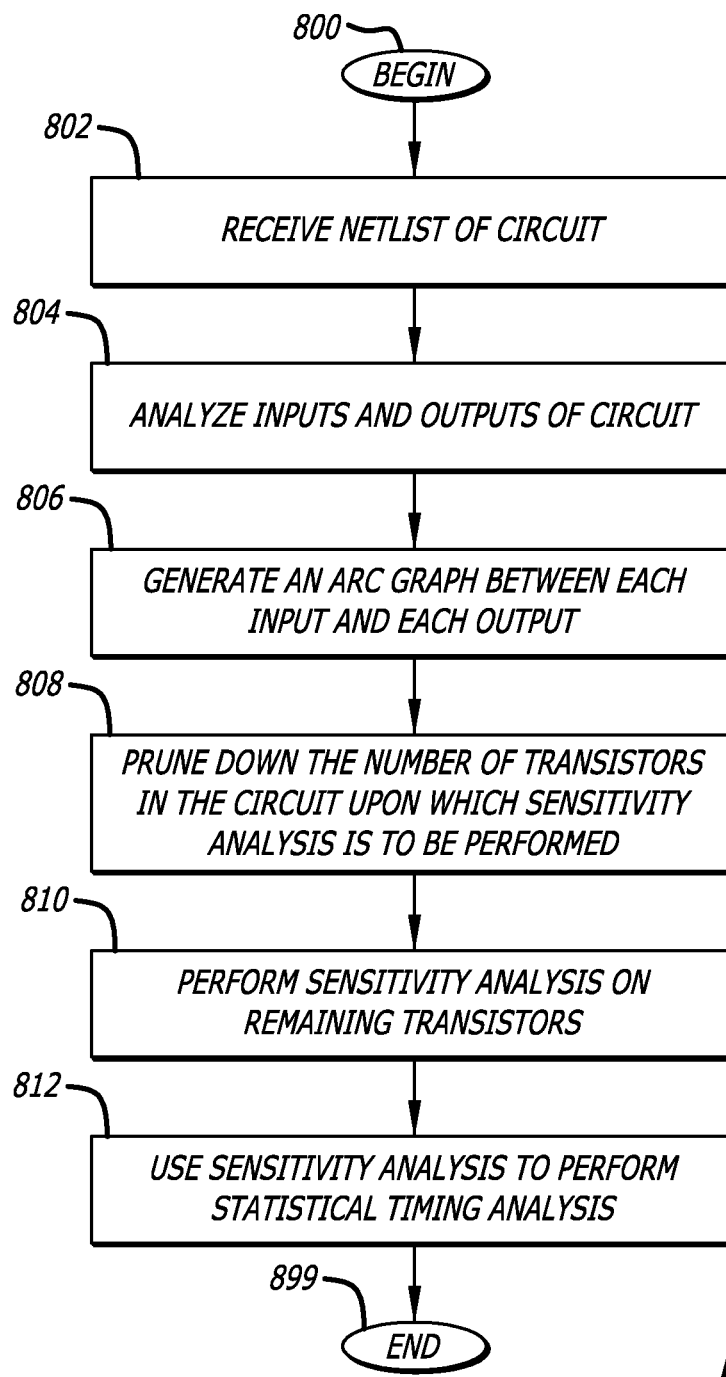
FIG. 8 is a flow chart of a reduction method for efficiently determining sensitivity and timing variations due to WID effects from process variations.

Referring now to FIG. 8, a reduction method for efficiently determining sensitivity and timing variations due to WID effects from process variations is illustrated. The method begins at block 800 and goes to block 802.

At block 802, a netlist of the circuit to be analyzed for WID effects is received. The process then goes to block 804.

At block 804, the circuit is analyzed to determine the input pins and output pins of the circuit. The input pins and output pins of the circuit may be further analyzed to determine the transistors in the circuit that are directly coupled thereto. The process then goes to block 806.

At block 806, an arc graph is generated for the circuit including timing arcs between each input pin and each output pin of the circuit. The process then goes to block 808.

At block 808, to improve simulation efficiency, the number of transistors in the circuit for which a sensitivity analysis is to be performed is pruned down. For example, the transistors directly coupled to the input pin and output pin of each timing arc for the circuit may be considered for a sensitivity analysis while other transistors are not analyzed for process variations. The process then goes to block 810.

At block 810, a sensitivity analysis is performed on each of the selected transistors of the circuit by the process block 808 that may directly effect timing in the timing arcs of the circuit. That is, a sensitivity analysis need not be performed on each and every transistor in the circuit. The process then goes to block 812.

At block 812, the sensitivity analyses performed on the selected transistors for WID effects due to process variations is used to perform a statistical timing analysis of the circuit. The process then goes to block 899 and ends.

The reduction methods for efficiently determining sensitivity and timing variations due to WID effects from process variations described herein may be used in various software tools for circuit design.

Figure 9A:
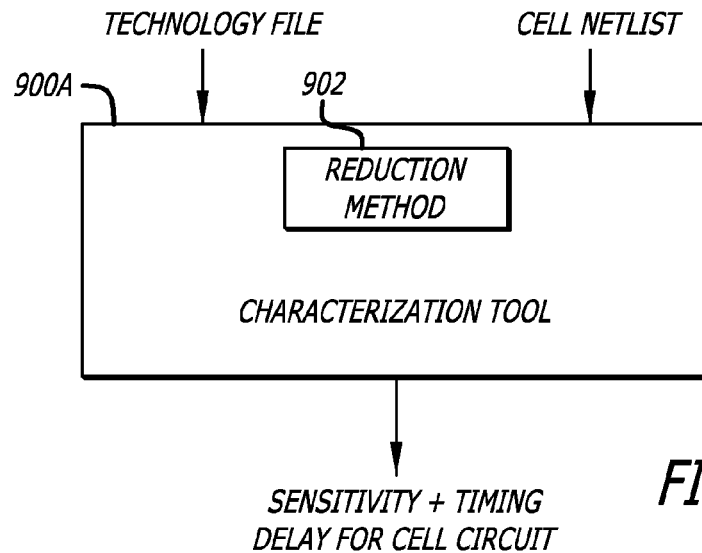
FIG. 9A is a block diagram of an exemplary characterization tool including software to perform the reduction method for efficiently determining sensitivity and timing variations due to WID effects from process variations.
Figure 9B:
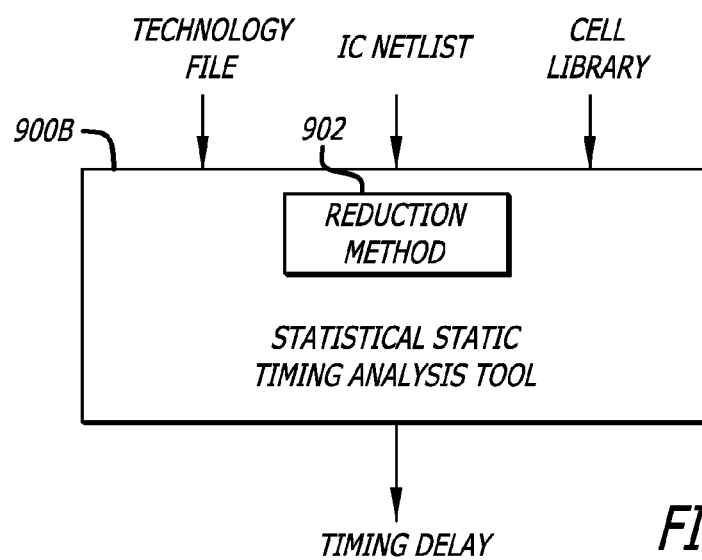
FIG. 9B is a block diagram of an exemplary statistical timing analysis tool including software to perform the reduction method for efficiently determining sensitivity and timing variations due to WID effects from process variations.

Referring now to FIGS. 9A-9B, block diagrams of exemplary circuit design software tools are illustrated that may employ the reduction methods described herein.

FIG. 9A illustrates a characterization tool 900A including a reduction method 902 to efficiently characterize a cell subcircuit for sensitivity and timing variations due to WID effects from process variations. The characterization tool 900A receives a cell netlist and a technology file corresponding to the cell netlist. The reduction method 902 reduces the number of transistors in the cell netlist that need be considered for sensitivity and timing variations due to WID effects from process variations. The characterization tool 900A generates the sensitivity and timing delays for the cell subcircuit due to WID effects from process variations. The sensitivity and timing delays are annotated to the technology file for the cell subcircuit. The characterization tool 900A may be used repeatedly to characterize each logic cell and corresponding cell subcircuit of a cell library.

FIG. 9B illustrates a statistical timing analysis tool 900B including a reduction method 902 that may be used to efficiently characterize an integrated circuit for sensitivity and timing variations due to WID effects from process variations. The use of statistical timing analysis tools in analyzing the timing of integrated circuits is generally described in "First-Order Incremental Block-Based Statistical Timing Analysis" by C. Visweswariah, K. Ravindran, K. Kalafala, S. G. Walker, and S. Narayan; pages 331-336 published at Design Automation Conference (DAC) 2004, Jun. 7-11, 2004, San Diego, Calif.

The statistical static timing analysis tool 900B receives an integrated circuit netlist, a cell library, and one or more technology files corresponding to each cell in the cell library. The reduction method 902 reduces the number of transistors in the cell netlist that need be considered for sensitivity and timing variations due to WID effects from process variations. The statistical static timing analysis tool 900B generates the timing delay for the integrated circuit considering the cumulative WID effects from process variations for each cell of the integrated circuit. With the WID variations, the statistical static timing analysis tool 900B may generate results in terms of yield of the integrated circuit to its performance goals. By altering transistor sizes within a cell subcircuit in response to a yield number for the integrated circuit design, for example, the yield number may be increased so that the cost of manufacturing the integrated circuit die is less.

The reduction method 902 and the lookup table values for WID sensitivity may also be used in other computer aided design tool software such as a fast spice simulator or other design tools where the effect of within die variations should be captured by a model. Additionally, the methods described herein can be used with different types of information that is generated (e.g., derating factor, linear-sensitivities, quadratic sensitivities etc.), or different types of simulation setups and may improve runtime performance. Moreover, the underlying technique of analyzing data that is to be generated, and reducing the problem subspace in order to simulate and generate less data can improve runtime performance in a number of fields of computer science.

Computing System

Figure 10:
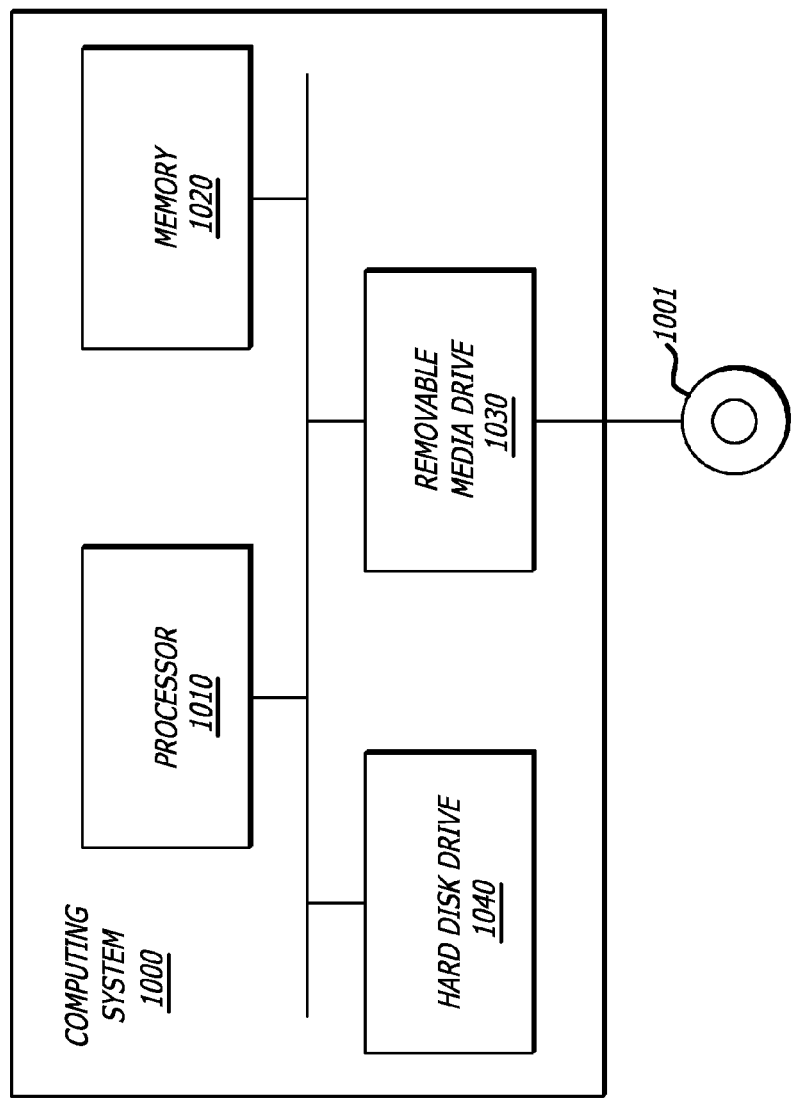
FIG. 10 illustrates an exemplary embodiment of a computing system usable with embodiments of the invention.

Referring now to FIG. 10, a computing system 1000 is illustrated that may be used to perform some or all of the processes in accordance with a number of embodiments of the invention. In one embodiment of the invention, the computing system 1000 includes a processor 1010, a memory 1020, a removable media drive 1030, and a hard disk drive 1040. In one embodiment, the processor 1010 executes instructions residing on a machine-readable medium, such as the hard disk drive 1040, a removable medium 1001 (e.g., an optical medium (compact disk (CD), digital video disk (DVD), etc.), a magnetic medium (magnetic disk, a magnetic tape, etc.), or a combination of both. The instructions may be loaded from the machine-readable medium into the memory 1020, which may include Random Access Memory (RAM), dynamic RAM (DRAM), etc. The processor 1010 may retrieve the instructions from the memory 1020 and execute the instructions to perform the operations described above.

Note that any or all of the components and the associated hardware illustrated in FIG. 10 may be used in various embodiments of the system 1000. However, it should be appreciated that other configurations of the system 1000 may include more or less devices than those shown in FIG. 10.

Some portions of the preceding detailed description have been presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The embodiments of the invention also relate to an apparatus for performing the operations described herein. This apparatus may be specially constructed for the required purposes, or it may comprise a general-purpose computer selectively activated or reconfigured by a computer program stored in the computer.

When implemented in a computer program or software, the elements of the embodiments of the invention are essentially the code segments to perform the necessary tasks. The program or code segments can be stored in a computer or processor readable storage medium or transmitted by a computer data signal embodied in a carrier wave over a transmission medium or communication link. The "processor readable storage medium" may include any medium that can store or transfer information. Examples of the processor readable medium include an electronic circuit, a semiconductor memory device, a read only memory (ROM), a flash memory, an erasable programmable read only memory (EPROM), a floppy diskette, a CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will appear from the description below. In addition, the embodiments of the invention is not described with reference to any particular programming language. It will be appreciated that a variety of programming languages may be used to implement the teachings of the invention as described herein.

CONCLUSION

The embodiments of the invention are thus described. While certain exemplary embodiments have been described and shown in the accompanying drawings, it is to be understood that such embodiments are merely illustrative of and not restrictive on the broad invention, and that the embodiments of the invention not be limited to the specific constructions and arrangements shown and described, since various other modifications may occur to those ordinarily skilled in the art. Instead, the embodiments of the invention should be construed according to the claims that follow below.

What is claimed is:

1. A non-transitory machine readable media having instructions stored thereon that when executed by a machine causes the machine to perform operations comprising:
    determining input transistors directly coupled to one or more input pins but not one or more output pins of a subcircuit, the subcircuit including a number of transistors;
    performing a timing analysis over one or more timing arcs of the subcircuit between the one or more input pins and the one or more output pins of the subcircuit to determine nominal subcircuit timing of the one or more timing arcs;
    performing an initial sensitivity analysis of subcircuit timing for a single perturbation of a first parameter in each transistor of the subcircuit over the one or more timing arcs;
    performing an input slew sensitivity analysis for within die process variations over the one or more timing arcs of the subcircuit between the one or more input pins and the one or more output pins of the subcircuit by perturbing the input transistors for one or more process variations over a plurality of input slew rates; and
    annotating results of the initial sensitivity analysis and the input slew sensitivity analysis to timing information of the subcircuit in a cell library;
    wherein the number of transistors to perturb to perform the input slew sensitivity analysis for within die process variations over the one or more timing arcs is fewer to reduce the number of simulations to characterize the subcircuit for within die variations.

2. The non-transitory machine readable media of claim 1, further storing instructions that when executed by the machine causes the machine to perform operations comprising:
    determining output transistors directly coupled to the one or more output pins but not the one or more input pins of the subcircuit; and
    performing an output load sensitivity analysis for within die process variations over the one or more timing arcs of the subcircuit between the one or more input pins and the one or more output pins of the subcircuit by perturbing the output transistors for one or more process variations over a plurality of output capacitance loads.

3. The non-transitory machine readable media of claim 2, further storing instructions that when executed by the machine causes the machine to perform operations comprising:
    determining input/output transistors, if any, directly coupled between the one or more input pins and the one or more output pins of the subcircuit; and
    performing an input slew sensitivity analysis and an output load sensitivity analysis for within die process variations over the one or more timing arcs of the subcircuit between the one or more input pins and the one or more output pins of the subcircuit by perturbing the input/output transistors for one or more process variations over a plurality of input slew rates and a plurality of output capacitance loads.

4. The non-transitory machine readable media of claim 1, further storing instructions that when executed by the machine causes the machine to perform operations comprising:
    repeating the determining and the performing for each subcircuit of a plurality of cell subcircuits in a cell library; and
    annotating results of the initial sensitivity analysis and the input slew sensitivity analysis to timing information of each subcircuit in the cell library.

5. The non-transitory machine readable media of claim 4, further storing instructions that when executed by the machine causes the machine to perform operations comprising:
    performing a statistical static timing analysis on an integrated circuit including one or more subcircuits of the cell library.

6. The non-transitory machine readable media of claim 5, wherein
the performing of the statistical static timing analysis determines a yield of the integrated circuit responsive to within die variations of the subcircuit.

7. A method for electronic circuit design, the method comprising:
determining input transistors directly coupled to one or more input pins but not one or more output pins of a subcircuit, the subcircuit including a number of transistors;
performing a timing analysis over one or more timing arcs of the subcircuit between the one or more input pins and the one or more output pins of the subcircuit to determine nominal subcircuit timing of the one or more timing arcs;
performing an initial sensitivity analysis of subcircuit timing for a single perturbation of a first parameter in each transistor of the subcircuit over the one or more timing arcs;
performing an input slew sensitivity analysis for within die process variations over the one or more timing arcs of the subcircuit between the one or more input pins and the one or more output pins of the subcircuit by perturbing the input transistors for one or more process variations over a plurality of input slew rates; and
annotating results of the initial sensitivity analysis and the input slew sensitivity analysis to timing information of the subcircuit in a cell library;
wherein the number of transistors to perturb to perform the input slew sensitivity analysis for within die process variations over the one or more timing arcs is fewer to reduce the number of simulations to characterize the subcircuit for within die variations,
wherein the timing analysis is performed with a processor.

8. The method of claim 7, further comprising:
determining output transistors directly coupled to the one or more output pins but not the one or more input pins of the subcircuit; and
performing an output load sensitivity analysis for within die process variations over the one or more timing arcs of the subcircuit between the one or more input pins and the one or more output pins of the subcircuit by perturbing the output transistors for one or more process variations over a plurality of output capacitance loads.

9. The method of claim 8, further comprising:
determining input/output transistors, if any, directly coupled between the one or more input pins and the one or more output pins of the subcircuit; and
performing an input slew sensitivity analysis and an output load sensitivity analysis for within die process variations over the one or more timing arcs of the subcircuit between the one or more input pins and the one or more output pins of the subcircuit by perturbing the input/output transistors for one or more process variations over a plurality of input slew rates and a plurality of output capacitance loads.

10. The method of claim 7, further comprising:
repeating the determining and the performing for each subcircuit of a plurality of cell subcircuits in a cell library; and
annotating results of the initial sensitivity analysis and the input slew sensitivity analysis to timing information of each subcircuit in the cell library.

11. The method of claim 10, further comprising:
performing a statistical static timing analysis on an integrated circuit including one or more subcircuits of the cell library.

12. The method of claim 11, wherein
the performing of the statistical static timing analysis determines a yield of the integrated circuit responsive to within die variations of the subcircuit.

13. An apparatus for electronic circuit design, the apparatus comprising:
one or more processors to execute machine readable instructions; and
a non-transitory machine readable medium coupled to the one or more processors to analyze a circuit design, the machine readable medium storing machine readable instructions for execution by the one or more processors, the machine readable instructions stored in the machine readable medium including
instructions to determine input transistors directly coupled to one or more input pins but not one or more output pins of a subcircuit, the subcircuit including a number of transistors;
instructions to perform a timing analysis over one or more timing arcs of the subcircuit between the one or more input pins and the one or more output pins of the subcircuit to determine nominal subcircuit timing of the one or more timing arcs;
instructions to perform an initial sensitivity analysis of subcircuit timing for a single perturbation of a first parameter in each transistor of the subcircuit over the one or more timing arcs;
instructions to perform an input slew sensitivity analysis for within die process variations over the one or more timing arcs of the subcircuit between the one or more input pins and the one or more output pins of the subcircuit by perturbing the input transistors for one or more process variations over a plurality of input slew rates; and
instructions to annotate results of the initial sensitivity analysis and the input slew sensitivity analysis to timing information of the subcircuit in a cell library;
wherein the number of transistors to perturb to perform the input slew sensitivity analysis for within die process variations over the one or more timing arcs is fewer to reduce the number of simulations to characterize the subcircuit for within die variations.

14. The apparatus of claim 13, wherein the machine readable instructions stored in the machine readable medium further include
instructions to determine output transistors directly coupled to the one or more output pins but not the one or more input pins of the subcircuit; and
instructions to perform an output load sensitivity analysis for within die process variations over the one or more timing arcs of the subcircuit between the one or more input pins and the one or more output pins of the subcircuit by perturbing the output transistors for one or more process variations over a plurality of output capacitance loads.

15. The apparatus of claim 14, wherein the machine readable instructions stored in the machine readable medium further include
instructions to determine input/output transistors, if any, directly coupled between the one or more input pins and the one or more output pins of the subcircuit; and
instructions to perform an input slew sensitivity analysis and an output load sensitivity analysis for within die process variations over the one or more timing arcs of the subcircuit between the one or more input pins and the one or more output pins of the subcircuit by perturbing the input/output transistors for one or more process variations over a plurality of input slew rates and a plurality of output capacitance loads.

16. The apparatus of claim 13, wherein the machine readable instructions stored in the machine readable medium further include instructions to repeat the determining and the performing for each subcircuit of a plurality of cell subcircuits in a cell library; and instructions to annotate results of the initial sensitivity analysis and the input slew sensitivity analysis to timing information of each subcircuit in the cell library.

17. The apparatus of claim 16, wherein the machine readable instructions stored in the machine readable medium further include instructions to perform a statistical static timing analysis on an integrated circuit including one or more subcircuits of the cell library.

18. The apparatus of claim 17, wherein the performing of the statistical static timing analysis determines a yield of the integrated circuit responsive to within die variations of the subcuit.

* * * * *